US008368593B2

(12) United States Patent
Zhodzishsky et al.

(10) Patent No.: US 8,368,593 B2
(45) Date of Patent: Feb. 5, 2013

(54) MEASUREMENT OF ENERGY POTENTIAL (SIGNAL-TO-NOISE RATIO) IN DIGITAL GLOBAL NAVIGATION SATELLITE SYSTEMS RECEIVERS

(75) Inventors: Mark Isaakovich Zhodzishsky, Moscow (RU); Victor Abramovich Veitsel, Moscow (RU); Vladimir Victorovich Beloglazov, Moscow (RU); Andrey Vladimirovich Veitsel, Moscow (RU); Sergey Borisovich Yudanov, Moscow (RU)

(73) Assignee: Topcon GPS, LLC, Oakland, NJ (US)

( * ) Notice: Subject to any disclaimer, the term of this patent is extended or adjusted under 35 U.S.C. 154(b) by 613 days.

(21) Appl. No.: 12/342,283

(22) Filed: Dec. 23, 2008

(65) Prior Publication Data

US 2009/0179795 A1   Jul. 16, 2009

Related U.S. Application Data

(60) Provisional application No. 61/011,012, filed on Jan. 14, 2008.

(51) Int. Cl.
*G01S 19/29* (2010.01)
*G01S 19/30* (2010.01)
(52) U.S. Cl. .............................. 342/357.68; 342/357.69
(58) Field of Classification Search ............ 342/357.32, 342/357.46, 357.74, 357.68, 357.69; 701/468
See application file for complete search history.

(56) References Cited

PUBLICATIONS

PCT International Search Report corresponding to PCT Application PCT/US2009/000149 filed Jan. 9, 2009 (3 pages).
PCT Written Opinion of the International Searching Authority corresponding to PCT Application PCT/US2009/000149 filed Jan. 9, 2009 (9 pages).
Van Dierendonck, A.J., et al., "Determination of C/A Code Self-Interference Using Cross-Correlation Simulations and Receiver Bench Tests", ION GPS 2002, Sep. 27, 2002, pp. 630-642, Portland, USA.
Van Dierendonck, A.J., "GPS Receivers" in Parkinson B.W. et al., "Global Positioning System Theory and Applications", Jan. 1, 1994, pp. 329-407, Washington DC.
Sharawi, Mohammad S. et al., "GPS C/NO Estimation in the presence of Interference and Limited Quantization Levels", IEEE Transactions on Aerospace and Electronic Systems, IEEE Service Center, Jan. 1, 2007, pp. 227-238, Piscataway, New Jersey.
Lopez-Risueno, G et al., "CNO Estimation and Near-Far Mitigation for GNSS Indoor Receivers", Vehicular Technology Conference, May 30, 2005, pp. 2624-2628, Piscataway, New Jersey.
W. De Wilde, et al., "New Fast Signal Acquisition Unit for GPS/Galileo Receivers", ENC GNSS 2006, Manchester, May 7-10, 2006.

*Primary Examiner* — Dao Phan
(74) *Attorney, Agent, or Firm* — Wolff & Samson PC

(57) ABSTRACT

The energy potential of a receiver receiving signals from a navigation satellite is calculated according to an algorithm which is a function of an estimate of the mean and an estimate of the variance of a correlation signal. Improving the accuracy of measuring the energy potential may be achieved by improving the variance estimate. The variance estimate may be determined from measurements of the correlation signal over long time intervals during operation of the receiver. The variance estimate may also be determined during a calibration procedure, or by mathematical modeling of the receiver.

38 Claims, 3 Drawing Sheets

MEASUREMENT OF ENERGY POTENTIAL (SIGNAL-TO-NOISE RATIO) IN DIGITAL GLOBAL NAVIGATION SATELLITE SYSTEMS RECEIVERS

This application claims the benefit of U.S. Provisional Application No. 61/011,012 filed Jan. 14, 2008, which is incorporated herein by reference.

BACKGROUND OF THE INVENTION

The present invention relates generally to satellite navigation systems, and more particularly to satellite navigation receivers.

Global navigation satellite systems (GNSSs) are widely used to accurately determine position with the aid of navigation receivers. Examples of GNSSs include the Global Positioning System (GPS) [USA] and Global Orbital Navigation System (GLONASS) [Russia]. Other GNSSs, such as Galileo [European], are being planned.

In GPS, a constellation of satellites transmit radio signals at a fixed carrier frequency. The two principal carrier frequencies are 1.57542 GHz (L1 carrier) and 1.22760 GHz (L2 carrier). The L1 carrier is modulated with a coarse acquisition (C/A) pseudorandom (PR) code, which is inversely modulated by binary information symbols. The PR code transmitted from a specific satellite uniquely identifies the specific satellite. Information carried in the radio signal includes the orbit position of the satellite. A single satellite channel refers to a (carrier, PR code) pair. A GPS receiver on Earth receives a satellite channel and decodes the information. From the delay time between the time of transmission of the PR code by the satellite and the time of reception of the PR code by the receiver, the distance between the receiver and the satellite may be calculated if the velocity of the radio signal is known. By calculating the distances between the receiver and several (typically four) satellites whose positions are known, the position of the receiver may be calculated.

The carriers are also modulated by precision encrypted P(Y) codes (herein called P code). The L1 carrier is modulated by the P1 code. The L2 carrier is modulated by the P2 code. The C/A code may be decoded by any user. The P codes, however, are high-security codes, which may be decrypted only by select organizations, such as US defense agencies.

Note that the transmission time of the PR code is referenced to the clock in the satellite, but the reception time of the PR code is referenced to the clock in the receiver. Since the two clocks are not synchronized, the delay time calculated from the simple difference between the reception time and the transmission time yields a pseudo-delay time, and the distance calculated from the pseudo-delay time is referred to as the pseudorange. More precise measurements of the delay time may be calculated from the full-phase difference between the signal transmitted from the satellite and the signal received by the receiver. The full-phase difference may be calculated as the total integer number of complete cycles plus a fractional cycle of the carrier wave transmitted during propagation of the signal from the satellite to the receiver. Measuring the fractional cycle may be performed in a straightforward manner, but tracking the total number of complete cycles is more difficult. Errors resulting from improper tracking of the total number of complete cycles are referred to as integer ambiguities.

In a GPS system, then, the delay time between the transmission time and the reception time of the signal may be characterized by an unambiguous, but relatively low-accuracy delay time derived from the PR code and a relatively accurate, but ambiguous, delay time derived from full-phases of the carrier. Both delay times are measured with signal processing loops. A delay-lock loop (DLL) is used to track delay times derived from PR codes (code delay). A phase-lock loop (PLL) is used to track carrier phase. Multiple signal processing loops of each type may be used to improve accuracy and reliability.

At the receiver, the received (input) signals are first processed by a series of linear operations in an integrated (common) single radiofrequency path. The linear operations include amplification, frequency conversion, and filtration. The processed signals are then sampled by an analog-to-digital converter (ADC). In the ADC, there is non-linear signal conversion to quantized levels. Different embodiments of receivers may use two-level or three-level quantization. Typically, a single ADC is used to sample multiple input channels. Each sample is multiplied by a reference carrier and a reference code, and successive multiplication products are accumulated. The reference carrier and the reference code are generated by the receiver. The reference carrier is typically generated in digital form and corresponds to the carrier of the received channel. The reference code corresponds to the PR code of the received channel. Processing units that perform multiplication and accumulation are referred to as correlators. Herein, the process performed by a correlator is referred to as correlation of two signals (input signal and reference signal).

There are several schemes for processing a channel. For example, a channel may be processed by three correlators, in which the reference carriers (one for each correlator) are coherently generated. The first correlator calculates the in-phase correlation signal I*. This signal may be obtained if the first reference carrier is in-phase with the input signal carrier. The reference code is a copy of the PR code modulating the input signal. When there is a phasing error of the reference carrier $\phi$ and a time offset of the reference code $\epsilon$, then the signal I* may be represented as:

$$I^* = \mu U_s R_0(\epsilon) \cos \phi, \quad (1)$$

where, $\mu$ is the binary information symbol;

$U_s$ is the amplitude of the received signal; and $R_0(\epsilon)$ is the cross-correlation function of the PR code (after passing through a receiver filter) and the reference code (which is a locally generated replica of the PR code for the input signal).

The signal I* is used to extract information symbols and normalize the PLL and DLL discriminators.

The second correlator calculates the quadrature correlation signal Q*. This signal may be obtained if the second reference carrier is shifted by $\pi/2$ from the first reference carrier. The reference code is the same as the one used in the first correlator. The signal Q* is then calculated as follows:

$$Q^* = \mu U_s R_0(\epsilon) \sin \phi. \quad (E2)$$

The quadrature signal Q* is used in the PLL discriminator. The signals Q* and I* are also used for estimating the energy potential (see below) of the received channel.

The third correlator calculates the correlation signal dI* used for controlling the DLL. To obtain this signal, the first reference carrier (in phase with the input carrier) is used. The reference code consists of short strobe pulses corresponding to the changes in the sign of the input PR code elements (chips). Note that the sign of a strobe pulse matches the sign of the chip which follows the next strobe pulse.

To make the DLL and PLL of each channel in the receiver lock on to a signal, there are system modules that search for delay and frequency. The delay search system module sets an initial delay of the reference code as close as possible to the input PR code delay. If the setting error of the initial delay does not exceed the limits of the DLL lock-in range, then the DLL settles on the steady balance point. The frequency search system module sets an initial frequency of the reference carrier with an error not exceeding the PLL lock-in range (capture range). When the DLL and PLL are operating in the tracking mode, the corresponding errors may be small, and the following approximations hold:

$Q^* \approx N_Q$;

$I^* \approx \mu U_s + N_I$, (3)

where $N_Q$ and $N_I$ are the noise at the outputs of the corresponding correlators.

Tracking systems (DLL and PLL) output PR code delay measurements, carrier phase measurements, and navigational parameters for each channel. For example, each GPS satellite transmits three signals: the C/A (coarse/acquisition) PR code on the L1 carrier, the P1 PR code on the L1 carrier, and the P2 PR code on the L2 carrier. There is a pseudorange and a full-phase measurement associated with each of these signals. Therefore, for each satellite, there is a set of six total measurements for pseudoranges and full phases. Pseudorange and full-phase measurements from different satellites, along with the information being conveyed by the information symbols µ, are processed in a navigation processor to determine the coordinates and speed of the user (herein, user refers to a person holding the receiver or to an object, such as a vehicle, on which the receiver is mounted). Reference time bases are also established by the navigation processor. In addition to pseudoranges and full phases, the receiver measures the energy potential. The energy potential is the ratio $C/N_0$, where C is the signal power of the carrier, and $N_0$ is the single-side spectral density of wideband Gaussian noise (that is, the noise power in a 1-Hz bandwidth). The value $C/N_0$ is measured in Hz. The signal-to-noise ratio (SNR) is measured in dB-Hz:

$SNR = 10 \log_{10}[C/N_0]$ dB-Hz. (E4)

As discussed above, the output correlator signal is modulated with binary information symbols $\mu(t)=\pm 1$. The duration of a symbol is $T_s = 20T_e$, where $T_e$ is the accumulation time in the correlators. For GPS receivers, $T_e$ is the same as the C/A signal period (epoch); therefore, $T_e = 10^{-3}$ s. The boundary of each symbol coincides with the boundary of one of the epochs. The signal amplitude ($U_s$), and its corresponding power, is needed to determine $C/N_0$. The value $C/N_0$ could be obtained from (E3) by averaging, if the symbol modulation is first removed. If µ in the receiver were exactly known, then the modulation could be removed by multiplication, using the operations:

$I = \mu I^*$;

$Q = \mu Q^*$. (E5)

Since, however, the value of µ in the receiver is not a priori known, an estimate $\hat{\mu}$ is used instead of the true µ. There is then a probability of estimate error; that is, the probability that $\hat{\mu} \neq \mu$. Instead of (E5), the following operations are then used:

$I = \hat{\mu} I^*$;

$Q = \hat{\mu} Q^*$. (E6)

The simplest estimate is $\hat{\mu} = \text{sgn } I$, where sgn I is the sign (−1, +1) of I. This estimate may be used in the acquisition mode even when the boundaries of the binary symbols have not been determined, but PR-code synchronization has been achieved. If the receiver has already defined the boundaries of the binary symbols, however, then a more reliable estimate (with smaller error probability) may be:

$$\hat{\mu} = \text{sgn} \sum_{i=1}^{20} I_i^*, \qquad (E7)$$

in which all the components of I* within the duration of each symbol (that is, 20 ms) are summed.

A key factor which impacts the performance of methods for determining SNR is the digital processing for generating the correlation signals; in particular, at low-level quantization. Two models for representing the orthogonal components I and Q have been developed. The first model [described in A. J. Van Dierendonck and G. McGraw, R. Coker, Determination of C/A Code Self-Interference Using Cross-Correlation Simulations and Receiver Bench Tests, ION GPS 2002, 24-27, September 2002] corresponds to a linear channel in which the expected values of these components are defined only by the signal and their variances are defined only by noise. The second model [described in GLONASS, Design and operation concepts, $3^{rd}$ edition, ed. By F. Perov and V. Kharistov, Moscow, Radiotechnika, 2005 (in Russian)] describes a "normalized channel" in which the power at the correlator input is considered to be fixed. Since the noise power always exceeds the signal power in the receiver, the noise power may be considered to be fixed. The expected values of the correlation components then depend on the signal-to-noise ratio, and their variances are determined by parameters of a particular processing algorithm.

For both models in the tracking mode, the following typical algorithm is executed over a time interval $T_M$. The expected value (MI) of value I is first calculated. The variance (DI) of value I is then calculated. The energy potential is then calculated as:

$$C/N_0 = \frac{1}{2T_e} \frac{(MI)^2}{DI} \text{ Hz}, \qquad (E8)$$

where $T_e$ is the accumulation time in the correlator (for the C/A signal in GPS, $T_e = 10^{-3}$ s). Then, $$SNR = 10 \log_{10}\left[\frac{1}{2T_e} \frac{(MI)^2}{DI}\right] \text{ dB-Hz}. \qquad (E9)$$

Other estimates of $C/N_0$ use both the in-phase correlation signal I and the quadrature correlation signal Q to reduce the impact of tracking errors. The algorithm described above is robust, and may be applied to any receiver. Its computational parameters do not depend on the radiofrequency (RF)-path performance. In particular, they do not depend on the RF-bandwidth $B_{RF}$ and the sampling frequency $f_s$. The algorithm, however, requires reliable estimates of MI and DI over a short time interval $T_M$. Note that, in a real receiver, the energy potential is measured just after the ADC and digital correlator, but not in a linear receiver path. Therefore, the equivalent energy potential $(C/N_0)_e$ is actually estimated in the digital receiver according to (E8) and (E9). Therefore, instead of (E8) and (E9), the following relationships hold:

$$(C/N_0)_e = \frac{1}{2T_e} \frac{(I_n)^2}{D_n} \text{ Hz} \qquad (E10)$$

$$SNR_e = 10\log_{10}(C/N_0)_e \text{ dB-Hz}, \qquad (E11)$$

where $I_n$ is the arithmetic mean obtained using the selection of n I-samples (readouts) at the correlator output over time interval $T_M$, and $D_n$ is the variance of the samples. The sample mean is used as an estimate of the true mean. The sample variance is used as an estimate of the true variance. Herein, $D_n$ is referred to as the variance estimate.

Since the correlators use digital signals, the measured $(C/N_0)_e$ value will differ from $(C/N_0)$ by a proportionality coefficient whose value depends on the quantization conditions for sampling the signals and on other processing parameters. In addition, the values $I_n$ and $D_n$ calculated from the limited number of samples will differ from the true expected value and variance. Errors in calculating the values of $I_n$ and $D_n$ may be of significance when fast changes in signal power does not allow a long time interval $T_M$.

The estimate of equivalent energy potential for a satellite channel, along with current coordinate measurements, may be used to solve a variety of practical problems. For example [as discussed in the handbook "Digital radio-receiving systems" Ed. by M. Zhodzishsky, Moscow, "Radio and Svyaz", 1990 (in Russian)], when estimating PLL and DLL noise errors, the estimate of equivalent energy potential, may be used to take into account losses due to quantization during analog-to-digital conversion. Estimates of equivalent energy potential may also be used to detect loss of synchronization in PLLs and DLLs and to detect loss or corruption of binary information symbols during reception. As another example, in statistical processing of navigation information, the detection and corresponding reduction of the weight of a channel with sufficiently low values of $(C/N_0)_e$ may substantially improve the accuracy of coordinate measurements in a number of situations.

Measurement of $C/N_0$ is also of interest for applications outside of satellite navigation systems. For example, measurement of $C/N_0$ is used for analyzing radio-wave propagation in the atmosphere. Note that different algorithms define $C/N_0$ in different ways, depending upon operational conditions and receiver channel structures. The accuracy of the estimates of these measurements may also vary depending on the specific application. For example, the measured signal power C may vary not only due to signal attenuation during wave propagation, but also as a result of interference with reflected signals. If the measurement process is used to investigate the conditions of radio-wave propagation, multipath may be treated as an interference that may distort analytical results. If a threshold value of SNR is used as an alarm condition for tracking loss, however, then the measurement process may execute its task by checking the drop in energy potential due to interference/hashing.

What are needed are method and apparatus for determining the SNR of a receiver simultaneously with coordinate measurements. A method which measures the SNR within a short observation time is advantageous.

BRIEF SUMMARY OF THE INVENTION

In an embodiment of the invention, the energy potential in a receiver receiving signals from navigation satellites is determined according to the algorithm $$SNR_e = 20 \log_{10}(I_n) - K_c - \eta \text{ dB-Hz};$$

wherein $SNR_e$ is an estimate of the energy potential; $K_c$ is a characteristic constant which is a function of receiver design; and $\eta$ is an energy loss based on digital processing. The received signals are first digitized, and information symbols are removed. A correlation signal I is calculated and averaged over a first time interval to obtain an estimate $I_n$ of an expected value MI. The characteristic constant is calculated from the variance estimate $D_n$ of the correlation signal I over a second time interval. The variance estimate may be calculated during operation of the receiver, wherein the second time interval greatly exceeds the first time interval. The variance estimate may also be measured during a calibration procedure for the receiver, or calculated by mathematical modeling of the receiver.

These and other advantages of the invention will be apparent to those of ordinary skill in the art by reference to the following detailed description and the accompanying drawings.

DETAILED DESCRIPTION

Figure 1:
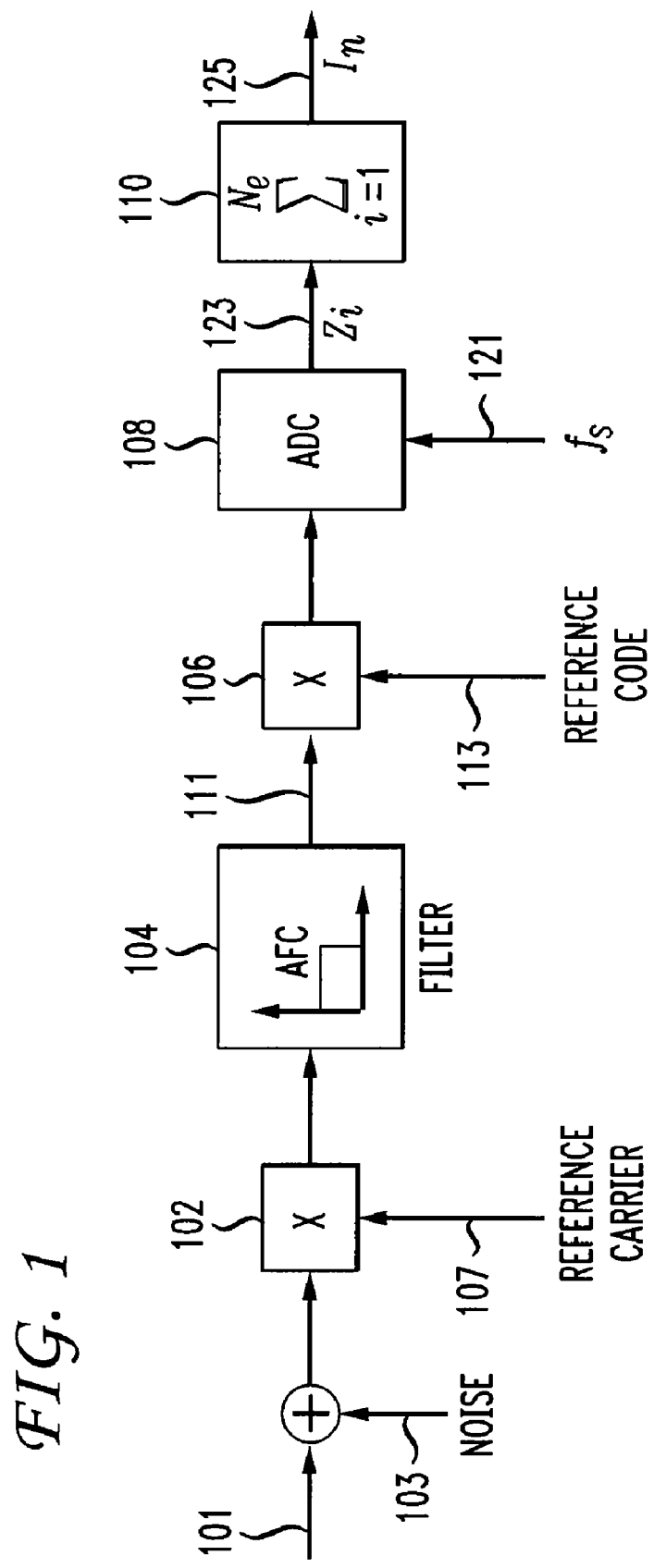
FIG. 1 shows an equivalent schematic for a receiver.

In the discussions below, the Global Positioning System (GPS) is used as an example of a global navigation satellite system (GNSS). One skilled in the art may develop embodiments of the invention applied to other GNSSs, such as the Global Orbital Navigation System (GLONASS). In an embodiment of the present invention, a new algorithm is used to calculate equivalent energy potential $SNR_e$ in the tracking mode:

$$SNR_e = 20 \log_{10}(I_n) - K_c \text{ dB-Hz}, \qquad (E12)$$

where $I_n$ is calculated as the arithmetic mean value of a selection of n I-samples collected during a limited time interval $T_M$, and $K_c$ is a constant characteristic of a specific receiver design.

The characteristic constant $K_c$ is a function of the variance of I and may be estimated using the variance estimate $D_n$. The characteristic constant $K_c$ may be determined either in advance during calibration of the receiver or during operation of the receiver. Herein, a time interval during operation refers to a time interval during which the receiver is being used for actual field measurements of coordinates. Herein, a time interval during calibration refers a time interval during which the receiver is not being used for actual field measurements of coordinates. Herein, a process (such as calculation or measurement) performed "in advance" refers to an operation performed prior to placing the receiver into operation.

If $K_c$ is calculated during operation, then the time interval for calculating $D_n$ may considerably exceed the time interval for calculating $I_n$. This longer time interval may be needed since $D_n$ may vary much slower than $I_n$, with $I_n$ being dependent on signal amplitude. In general, if a function varies rapidly with time, a short measurement interval is used to capture the dynamic behavior. If a long measurement interval is used, the variations are smoothed out, and short term variations are lost. For a function which varies slowly with time, however, the value of the function may be nearly constant over short measurement intervals. In this instance, a long measurement interval is used to capture the variation.

For various navigation receivers, for example, it has been experimentally determined that short term variations in $I_n$ may be captured over a time interval $T_M$ of ~300-1000 ms, while long term variations in $D_n$ may be captured over a time interval $T_D$ of ~5-10 s. The time interval $T_M$ and the time interval $T_D$ are user-specified values. In general, $T_D > T_M$ and, typically, $T_D \gg T_M$. The specific ranges are dependent on the receiver design and on user-specified values for allowable measurement errors.

There are various methods for determining the characteristic constant $K_c$ (for a specific receiver design). In one embodiment of the invention, detailed measurements of a receiver may be performed. In another embodiment of the invention, mathematical analysis may be performed if there is a sufficiently detailed mathematical model of the receiver structure. The results may then be applied to all receivers of the same design. These two approaches are discussed in further detail below.

If a detailed mathematical model (equivalent schematic) of the receiver is known, $D_n$ may be replaced with a calculated constant, which is a function of receiver characteristics. These characteristics include radio-path bandwidth, the receiver ADC, the number of quantization levels of reference oscillations, and the discretization (sampling) frequency. For a specific receiver design, these characteristics are similar and approximately constant. Therefore, the value $K_c$ may be determined in advance and stored in the receiver memory to use during operation. If the equivalent schematic of the receiver is known, then $K_c$ may be calculated under the following conditions:

Input to the digital receiver is the signal plus white noise;

In the tracking mode, the carrier phase and the code delay tracking errors are negligibly small;

Information symbols are ideally compensated;

In the correlator, harmonic reference carrier and reference code with rectangular pulse shapes are used;

Amplitude-frequency characteristic of RF path has a rectangular shape with a bandwidth $B_{LF}$ for low frequencies and a bandwidth $B_{IF}=2B_{LF}$ for intermediate frequencies;

Distortion of the edges of the modulating PR code pulses caused by transmission through the RF path is negligible;

Sampling frequency $f_s=B_{IF}=2B_{LF}$; and

A binary ADC is used for digitization.

The statistical characteristics of the I component may then be calculated according to the schematic shown in FIG. 1. Satellite signal 101 and additive white noise 103 are fed into a synchronous/in-phase detector 102, which uses reference carrier 107. The output of synchronous/in-phase detector 102 is fed into filter 104, which has a rectangular amplitude-frequency characteristic (AFC). The output of filter 104 is fed into operator 106, which demodulates the PRN code. The reference code is indicated in FIG. 1 as reference code 113. The output of operator 106 is fed into a binary analog-to-digital converter (ADC) 108, with a sampling frequency $f_s$ 121. The output of ADC 108 are samples $Z_i$ 123 which may have the values +1 or −1. The samples $Z_i$ 123 are then fed into sample accumulator 110, whose output 125 is the stored (accumulated) value $I_n$ corresponding to the value in expression (E10).

Therefore, for the receiver modeled in FIG. 1, $$SNR_e = 10\log_{10}\left(\frac{1}{2T_e}\frac{(MI)^2}{DI}\right) \quad (E13)$$

$$= 10\log_{10}\left\{\frac{1}{2T_e}(MI)^2/N_e\right\}$$

$$= 20\log_{10}(MI) - 10\log_{10}(2T_e N_e) \text{ dB-Hz}.$$

From (E12) and (E13), with MI replaced by its estimate $I_n$, it then follows that:

$$K_c = -10\log_{10}\left(\frac{B_{LF}}{N_e^2}\right), \quad (E14)$$

where $N_e$ is the number of samples which is stored for a specific $I_n$. The terms of the expression for $K_c$ are parameters of the receiver and may be defined in advance.

In another embodiment, the characteristic constant $K_c$ is experimentally determined by a receiver calibration procedure using a suitable source for the navigation signal. A signal from a real navigation satellite may be used, if the satellite has a high elevation which is easily received in open sky, and if there are no reflected signals. In the SNR measurement algorithm, the values $I_n$ and $D_n$ of the I component are first calculated. Then $K_c$ is calculated from (E9)-(E12), yielding the result:

$$K_c = 20\log_{10}(I_n) - 10\log_{10}\left[\frac{1}{2T_e}\frac{(I_n)^2}{D_n}\right]. \quad (E15)$$

To obtain good accuracy, it is important to choose the right experimental conditions under which the energy potential is nearly constant over a sufficiently long time interval T to get estimates $I_n$ and $D_n$ as close to their true values MI and DI as possible. In an advantageous embodiment, the time interval T is selected from the range of 10-30 minutes. For some instances, it may be expedient to use a standard satellite signal simulator as a source of satellite signals.

Note that both embodiments (derived from mathematical analysis or derived from experimental measurements) of determining the characteristic constant $K_c$ may be applied, leading to good correlation of results by successive improvements of the mathematical model and experimental measurements.

The actual SNR at the receiver input for the GPS C/A signal may be represented as $SNR_e + \eta$, where $SNR_e$ is a directly measured value, and $\eta$ is energy loss due to digital processing. Typically, $\eta=1-3$ dB. For an ADC with binary quantization (FIG. 1), $\eta=1.96$ dB. Therefore $$SNR_e = 20\log_{10}(I_n) - K_c - \eta \text{ dB-Hz}. \quad (E16)$$

Figure 3:
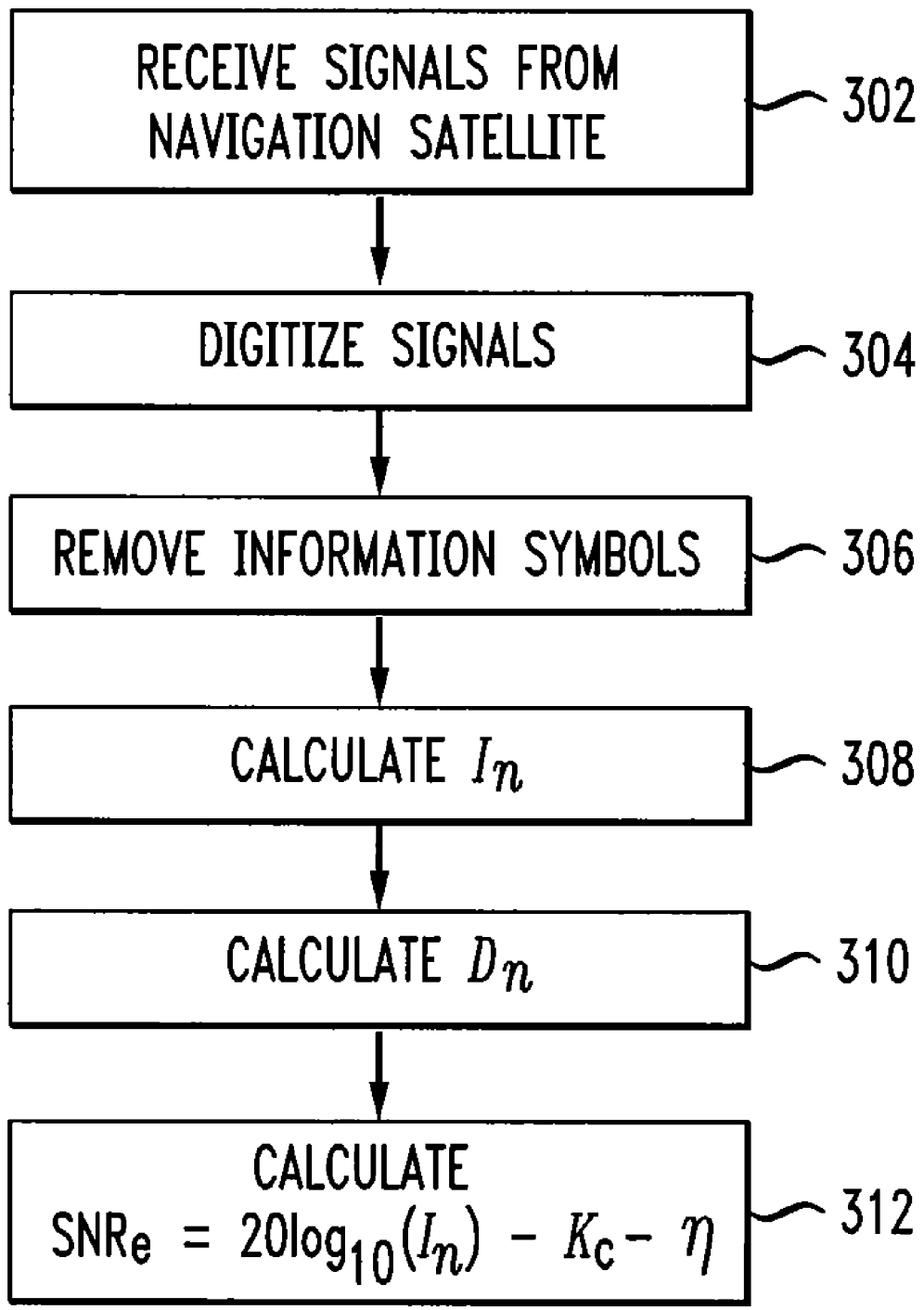
FIG. 3 shows a flowchart of steps for calculating energy potential, according to an embodiment of the invention.

FIG. 3 is a flowchart summarizing the steps for calculating the energy potential according to an embodiment of the invention. In step 302, signals from navigation satellites are received by the receiver. In step 304, the received signals are digitized. In step 306, the information signals are removed. In step 308, an estimate $I_n$ of the mean of a correlation signal is calculated from a measured sample of n-values. In step 310, the variance estimate $D_n$ is calculated from the sample. In step 312, the energy potential is calculated according to (E16).

In another embodiment, SNR is measured for a three-level ADC. The ADC parameters are determined by a threshold $\pi$. The output value Z then has three possible values: +1 if the input value exceeds $\pi$; −1 if the input value is smaller than −$\pi$; and 0 otherwise. Note that the expected/mean value of the output at high noise in the band of the intermediate-frequency amplifier is mainly defined by the signal-to-threshold ratio, and variance is mainly defined by the noise-to-threshold ratio. The same holds true for the expected value and variance of the I component. Therefore, the noise-to-threshold ratio for the experimental conditions under which the constant $K_c$ is determined should be the same as the noise-to-threshold ratio under real operating conditions.

To satisfy this condition, a noise stabilizer is used in the receiver. In one embodiment, adjustment of the noise power is provided according to a user-specified threshold by varying the amplification. The principle of operation of this stabilizer is similar to automatic gain control (AGC) for analog-to-digital design. In another embodiment, the threshold is adjusted according to the actual noise power. Automatic tuning of ADC threshold is implemented, typically via digital processing. The core of this tracking system is a discriminator which produces an error signal when the noise-to-threshold ratio [more precisely, the ratio of root-mean-square (RMS) noise to threshold $\pi$] $R_n$ deviates from a user-specified value of probability $R_0$. The discriminator (which may be implemented using digital components) contains a counter of Z samples ($q_n$) whose absolute value does not exceed the threshold $\pi$ over a user-specified time interval $T_c$. The ratio of $q_n$ to the total number of samples $T_c f_s$ is an estimate of the probability that the measured value is less than the threshold (and, therefore, an estimate of the probability that the measured value does not exceed the threshold). Herein, the probability that the measured value does not exceed the threshold is referred to as the non-exceedance probability. By assigning a user-specified value $R_0$ (for example, $R_0$=0.5) and measuring the actual value $R_n$=($q_n/T_c f_s$), the error signal proportional to ($R_n$−$R_0$) may be obtained. This error signal modifies the threshold $\pi$ in the tracking system according to the changes in noise power and thereby stabilizes their ratio. In an advantageous embodiment, $R_0$ is selected from the range of 0.4-0.6, and the sampling frequency $f_s$ is selected from the range of 40-50 MHz.

All the above considerations apply in the case of negligibly small PLL tracking errors. They may not be valid, however, during the acquisition mode (frequency pull-in) and during events in which large dynamic effects are encountered and the phase tracking error $\phi$ is large. In this case, instead of the I component in the calculation of SNR, an embodiment uses $S=\sqrt{I^2+Q^2}=U_S R_0(\epsilon)$, which does not depend on $\phi$.

Substituting S for I in (E16) then yields $$SNR_s = 20\log_{10}(S_n) - K_s - \eta \text{ dB-Hz;} \quad (E17)$$

where $S_n$ is the arithmetic mean obtained from $I_n$ samples and $Q_n$ samples at the correlator output over time interval $T_M$, and $K_s$ is a constant characteristic of a specific receiver design.

Substituting S for I in (E15) then yields $$K_s = -10\log_{10}\left[\frac{1}{2T_e}\frac{(S_n)^2}{D_s}\right] + 20\log_{10}(S_n). \quad (E18)$$

where $D_S$ is the variance estimate of S.

One skilled in the art may adapt embodiments of the invention for other types of digital receivers by maintaining operating conditions such that (E12) remains valid. The value $K_c$ is constant for a specific receiver design. As discussed above, $K_c$ may be derived mathematically or measured experimentally for a specific receiver design.

The algorithm represented in (E12) is advantageous because it reduces the statistical errors in calculation of the variance over short sampling intervals. If the energy potential is high enough, the accuracy gain achieved may be on the order of tens of dB. In addition, the sensitivity of the algorithm to external interference (and other undesired signals that affect the variance) drops. The determination of SNR with a preliminary estimate of $K_c$ removes the need to analyze the effect of external interference on estimating variance $D_n$, but requires calibration for each receiver design. The determination of SNR with calculation of variance over a sufficiently long time interval in the process of operation may be used for receivers with any configuration of RF and digital paths and does not require preliminary calibration. In this case, however, the SNR algorithm appears to be more sensitive to some types of external interference.

Figure 2:
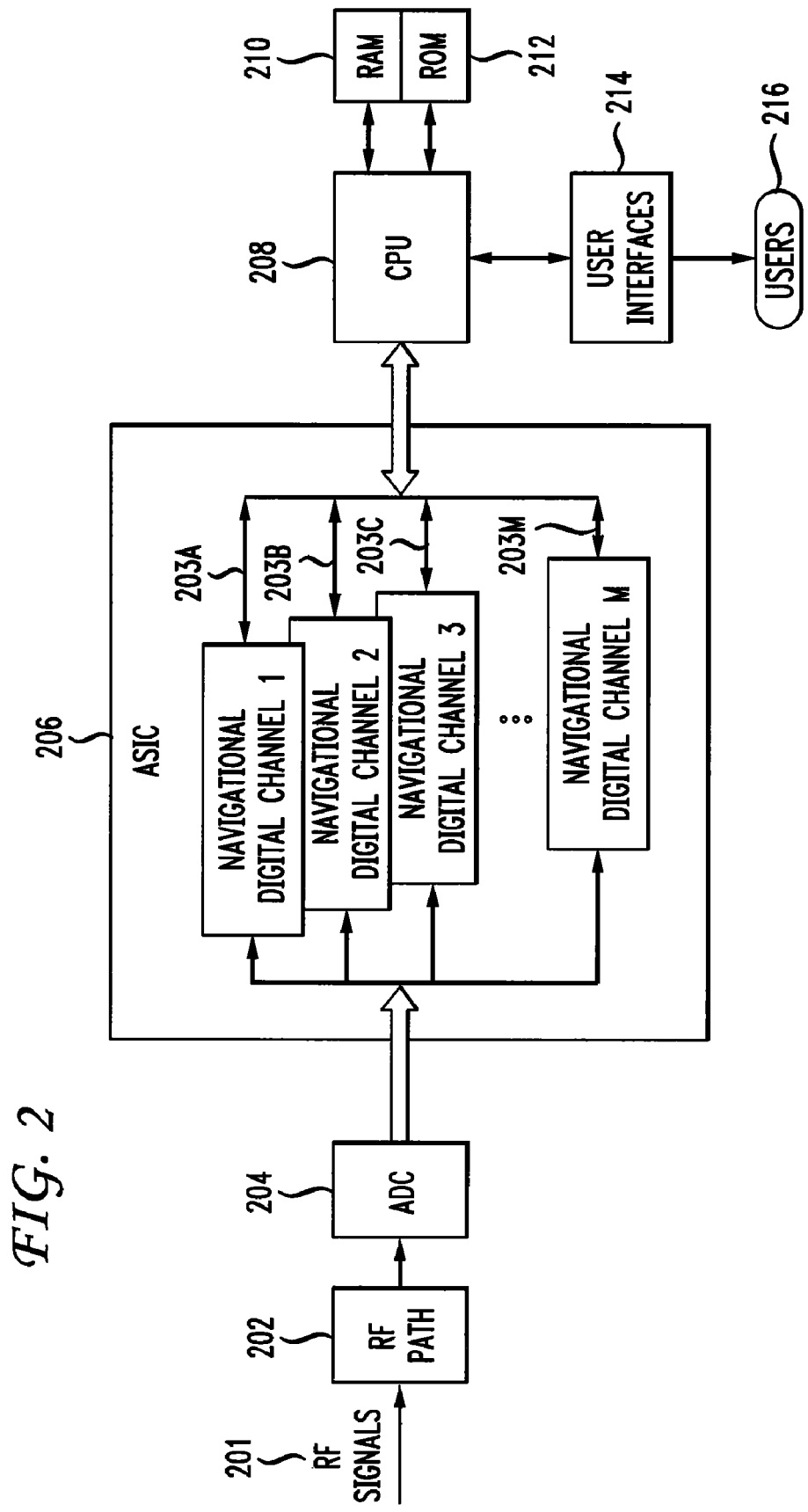
FIG. 2 shows a high-level schematic of a computational system in a navigation receiver.

An embodiment of a computational system for calculating the energy potential may be implemented within a navigation receiver, as shown in the high-level schematic of FIG. 2. The steps shown in the flowchart of FIG. 3 may be performed by the computational system. In FIG. 2, the received RF signals 201 are first processed by a series of linear operations in an integrated (common) single RF path 202. The linear operations include amplification, frequency conversion, and filtration. In some embodiments, a noise stabilizer may be included in RF path 202.

The processed signals are then sampled by an analog-to-digital converter ADC 204. In the ADC 204, there is non-linear signal conversion to quantized levels. Different embodiments of receivers may use two-level or three-level quantization. The output of ADC 204 is fed into application specific integrated circuit ASIC 206. In some embodiments, ASIC 206 may be a very large scale integrated circuit (VLSIC). In ASIC 206, the output of ADC 204 is processed in a set of navigational digital channels (NDCs). In FIG. 2, M channels, NDC1 203A-NDCM 203M are shown. The output of the M channels are the corresponding correlation components I and Q, which are processed by a central processing unit (CPU) 208, which is connected via a bus to random access memory RAM 210 and non-volatile read only memory ROM 212 (which may be flash memory, for example). CPU 208 operates under control of software which defines the overall operation of the computational system. In an embodiment, the software may comprise firmware stored in ROM 212.

CPU 208 executes program instructions which define the overall operation and applications. The program instructions may be stored in ROM 212 and loaded into RAM 210 when execution of the program instructions is desired. The method steps shown in the flowchart in FIG. 3 may be defined by program instructions stored in RAM 210 or in ROM 212 (or in a combination of RAM 210 and ROM 212) and controlled by the CPU 208 executing the program instructions. For example, the program instructions may be implemented as executable code programmed by one skilled in the art to perform algorithms implementing the method steps shown in the flowchart in FIG. 3. Accordingly, by executing the program instructions, the CPU 208 executes algorithms implementing the method steps shown in the flowchart in FIG. 3.

The computational system may further comprise a set (one or more) of user interfaces 214, such as, for example, a serial interface or a network interface. Computed values of SNR may be outputted to a user 216 via user interfaces 214.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for measuring energy potential in a receiver receiving signals from a plurality of navigation satellites, comprising the steps of:
digitizing, by a central processing unit, said received signals;
removing, by the central processing unit, information symbols from said digitized received signals;
calculating, by the central processing unit, a correlation signal I;
averaging, by the central processing unit, said correlation signal I over a time interval $T_M$ to obtain an estimate $I_n$ of an expected value MI;
calculating, by the central processing unit, a variance estimate $D_n$ of said correlation signal I over a time interval $T_D$, wherein the time interval $T_D$ is greater than the time interval $T_M$; and
calculating, by the central processing unit, an estimate $SNR_e$ of energy potential according to the algorithm $$SNR_e = 20\log_{10}(I_n) - K_c - \eta \text{ dB-Hz};$$

wherein:
$K_c$ is a characteristic constant based at least in part on said variance estimate $D_n$, and $\eta$ is an energy loss based on digital processing.

2. The method of claim 1, further comprising the steps of:
measuring said variance estimate $D_n$ during operation of said receiver; and
calculating said characteristic constant $K_c$ based at least in part on said measured variance estimate $D_n$.

3. The method of claim 2, wherein:
said time interval $T_M$ is selected from a range of 300-1000 milliseconds; and
said time interval $T_D$ is selected from a range of 5-10 seconds.

4. The method of claim 1, further comprising the steps of:
generating a mathematical model of an equivalent schematic of said receiver; and
calculating said characteristic constant $K_c$ based at least in part on said mathematical model.

5. The method of claim 1, further comprising the steps of:
measuring said variance estimate $D_n$ during calibration of said receiver; and
calculating said characteristic constant $K_c$ based at least in part on said measured variance estimate $D_n$.

6. The method of claim 5, wherein said calibration is performed with said received signals during a time interval T, wherein reflected signals and interference are absent and wherein said energy potential is constant.

7. The method of claim 6, wherein:
said time interval T is selected from a range of 10-30 minutes.

8. The method of claim 6, further comprising the steps of:
generating a test signal with a navigation satellite simulator;
receiving said test signal at said receiver; and
calculating during said time interval T said estimate $I_n$ and said variance estimate $D_n$ based at least in part on said received test signal.

9. The method of claim 8, wherein:
said time interval T is selected from a range of 10-30 minutes.

10. The method of claim 1, further comprising the step of:
calculating said characteristic constant $K_c$ according to the algorithm:

$$K_c = -10\log_{10}\left[\frac{1}{2T_e}\frac{(I_n)^2}{D_n}\right] + 20\log_{10}(I_n),$$

wherein $T_e$ is an accumulation time in a correlator.

11. The method of claim 1, wherein said step of digitizing said received signals comprises the step of:
digitizing said received signals with a 3-level analog-to-digital converter having a threshold Π, wherein there is a noise stabilizer in front of said 3-level analog-to-digital converter in an integrated radiofrequency path.

12. The method of claim 11, further comprising the step of:
maintaining the constancy of the root-mean-square (RMS) noise-to-threshold Π ratio by controlling a radiofrequency-path gain.

13. The method of claim 12, wherein the step of maintaining the constancy of the RMS noise-to threshold Π ratio further comprises the step of:
adjusting said threshold Π.

14. The method of claim 11, wherein said noise stabilizer operates according to a principle of operation common to a tracking system with a discriminator producing an error signal proportional to the difference between a user-specified value of probability $R_0$ and an estimate of non-exceedance probability of said threshold Π.

15. The method of claim 14, wherein said estimate of non-exceedance probability of said threshold Π is determined as a ratio of a number of samples of said 3-level analog-to-digital converter not exceeding said threshold Π to a total sample number ($T_c f_s$), wherein $T_c$ is a user-specified time interval and $f_s$ is the sampling frequency of said 3-level analog-to-digital converter.

16. The method of claim 15, wherein:
said time interval $T_c$ is approximately equal to said time interval $T_D$ during operation of said receiver;
said sampling frequency $f_s$ is selected from a range of 40-50 MHz; and
said value $R_0$ is selected from a range of 0.4-0.6.

17. The method of claim 15, wherein:
said time interval $T_c$ is approximately equal to a time interval T during calibration of said receiver, wherein reflected signals and interference are absent and wherein said energy potential is constant;
said sampling frequency $f_s$ is selected from a range of 40-50 MHz; and
said value $R_0$ is selected from a range of 0.4-0.6.

18. A method for measuring energy potential in a receiver receiving signals from a plurality of navigation satellites, comprising the steps of:
digitizing, by a central processing unit, said received signals;

removing, by the central processing unit, information signals from said digitized received signals;

calculating, by the central processing unit, a correlation signal I;

averaging, by the central processing unit, said correlation signal I over a time interval $T_M$ to obtain an estimate $I_n$ of an expected value MI;

calculating, by the central processing unit, a correlation signal Q;

averaging said correlation signal Q over said time interval $T_M$ to obtain an estimate $Q_n$ of an expected value MQ;

calculating, by the central processing unit, an estimate $S_n = [((I_n)^2 + (Q_n)^2]^{1/2}$;

calculating, by the central processing unit, a variance estimate $D_s$ of $S = (I^2 + Q^2)^{1/2}$ over a time interval $T_D$, wherein the time interval $T_D$ is greater than the time interval $T_M$; and calculating, by the central processing unit, an estimate $SNR_s$ of energy potential according to the algorithm $SNR_s = 20 \log_{10}(S_n) - K_s - \eta$ dB-Hz, wherein:
$K_s$ is a characteristic constant based at least in part on said variance estimate $D_s$, and $\eta$ is an energy loss based on digital processing.

19. The method of claim 18, further comprising the steps of:
measuring said variance estimate $D_s$ during operation of said receiver; and
calculating said characteristic constant $K_s$ based at least in part on said measured variance estimate $D_s$.

20. The method of claim 19, wherein:
said time interval $T_M$ is selected from a range of 300-1000 milliseconds; and
said time interval $T_D$ is selected from a range of 5-10 seconds.

21. The method of claim 18, further comprising the steps of:
generating a mathematical model of an equivalent schematic of said receiver; and
calculating said characteristic constant $K_s$ based at least in part on said mathematical model.

22. The method of claim 18, further comprising the steps of:
measuring said variance estimate $D_s$ during calibration of said receiver; and
calculating said characteristic constant $K_c$ based at least in part on said measured variance estimate $D_s$.

23. The method of claim 22, wherein said calibration is performed with said received signals during a time interval T, wherein reflected signals and interference are absent and wherein said energy potential is constant.

24. The method of claim 23, wherein:
said time interval T is selected from a range of 10-30 minutes.

25. The method of claim 23, further comprising the steps of:
generating a test signal with a navigation satellite simulator;
receiving said test signal at said receiver; and
calculating during said time interval T said estimate $I_n$ and said variance estimate $D_n$ based at least in part on said received test signal.

26. The method of claim 25, wherein:
said time interval T is selected from a range of 10-30 minutes.

27. The method of claim 18, further comprising the step of:
calculating said characteristic constant $K_s$ according to the algorithm:

$$K_s = -10\log_{10}\left[\frac{1}{2T_e}\frac{(S_n)^2}{D_s}\right] + 20\log_{10}(S_n),$$

wherein $T_e$ is an accumulation time in a correlator.

28. The method of claim 18, wherein said step of digitizing said received signals comprises the step of:
digitizing said received signals with a 3-level analog-to-digital converter having a threshold Π, wherein there is a noise stabilizer in front of said 3-level analog-to-digital converter in an integrated radiofrequency path.

29. The method of claim 28, further comprising the step of:
maintaining the constancy of the root-mean-square (RMS) noise-to-threshold Π ratio by controlling a radiofrequency-path gain.

30. The method of claim 29, wherein the step of maintaining the constancy of the RMS noise-to threshold Π ratio further comprises the step of:
adjusting said threshold Π.

31. The method of claim 29, wherein said noise stabilizer operates according to a principle of operation common to a tracking system with a discriminator producing an error signal proportional to the difference between a user-specified value of probability $R_0$ and an estimate of non-exceedance probability of said threshold Π.

32. The method of claim 31, wherein said estimate of non-exceedance probability of said threshold Π is determined as a ratio of a number of samples of said 3-level analog-to-digital converter not exceeding said threshold Π to a total sample number ($T_c f_s$), wherein $T_c$ is a user-specified time interval and $f_s$ is the sampling frequency of said 3-level analog-to-digital converter.

33. The method of claim 32, wherein:
said time interval $T_c$ is approximately equal to said interval $T_D$ during operation of said receiver; and
said sampling frequency $f_s$ is selected from a range of 40-50 MHz; and
said value $R_0$ is selected from a range of 0.4-0.6.

34. The method of claim 32, wherein:
said time interval $T_c$ is approximately equal to a time interval T during calibration of said receiver, wherein reflected signals and interference are absent and wherein said energy potential is constant;
said sampling frequency $f_s$ is selected from a range of 40-50 MHz; and
said value $R_0$ is selected from a range of 0.4-0.6.

35. An apparatus for measuring energy potential in a receiver receiving signals from a plurality of navigation satellites, comprising:
means for digitizing said received signals;
means for removing information symbols from said digitized received signals;
means for calculating a correlation signal I;
means for averaging said correlation signal I over a time interval $T_M$ to obtain an estimate $I_n$ of an expected value MI;
means for calculating a variance estimate $D_n$ of said correlation signal I over a time interval $T_D$, wherein the time interval $T_D$ is greater than the time interval $T_M$; and
means for calculating an estimate $SNR_e$ of energy potential according to the algorithm $SNR_e = 20 \log_{10}(I_n) - \eta$ dB-Hz;

wherein:
  $K_c$ is a characteristic constant based at least in part on said variance estimate $D_n$, and η is an energy loss based on digital processing.

36. An apparatus for measuring energy potential in a receiver receiving signals from a plurality of navigation satellites, comprising:
  means for digitizing said received signals;
  means for removing information signals from said digitized received signals;
  means for calculating a correlation signal I;
  means for averaging said correlation signal I over a time interval $T_M$ to obtain an estimate $I_n$ of an expected value MI;
  means for calculating a correlation signal Q;
  means for averaging said correlation signal Q over said time interval $T_M$ to obtain an estimate $Q_n$ of an expected value MQ;
  means for calculating an estimate $S_n=[(I_n)^2+(Q_n)^2]^{1/2}$;
  means for calculating a variance estimate $D_s$ of $S=(I^2+Q^2)^{1/2}$ over a time interval $T_D$, wherein the time interval $T_D$ is greater than the time interval $T_M$; and
  means for calculating an estimate $SNR_s$ of energy potential according to the algorithm $SNR_s=20 \log_{10}(S_n)-K_s-\eta$ dB-Hz, wherein:
  $K_s$ is a characteristic constant based at least in part on said variance estimate $D_s$, and η is an energy loss based on digital processing.

37. A non-transitory computer readable medium storing computer instructions for measuring energy potential in a receiver receiving signals from a plurality of navigation satellites, which, when executed on a central processing unit, cause the central processing unit to perform operations comprising:
  digitizing said received signals;
  removing information symbols from said digitized received signals;
  calculating a correlation signal I;
  averaging said correlation signal I over a time interval $T_M$ to obtain an estimate $I_n$ of an expected value MI;
  calculating a variance estimate $D_n$ of said correlation signal I over a time interval $T_D$, wherein the time interval $T_D$ is greater than the time interval $T_M$; and
  calculating an estimate $SNR_e$ of energy potential according to the algorithm $SNR_e=20 \log_{10}(I_n)-\eta$ dB-Hz;

wherein:
  $K_c$ is a characteristic constant based at least in part on said variance estimate $D_n$, and η is an energy loss based on digital processing.

38. A non-transitory computer readable medium storing computer instructions for measuring energy potential in a receiver receiving signals from a plurality of navigation satellites, which, when executed on a central processing unit, cause the central processing unit to perform operations comprising:
  digitizing said received signals;
  removing information signals from said digitized received signals;
  calculating a correlation signal I;
  averaging said correlation signal I over a time interval $T_M$ to obtain an estimate $I_n$ of an expected value MI;
  calculating a correlation signal Q;
  averaging said correlation signal Q over said time interval $T_M$ to obtain an estimate $Q_n$ of an expected value MQ;
  calculating an estimate $S_n=[(I_n)^2+(Q_n)^2]^{1/2}$;
  calculating a variance estimate $D_s$ of $S=(I^2+Q^2)^{1/2}$ over a time interval $T_D$, wherein the time interval $T_D$ is greater than the time interval $T_M$; and
  calculating an estimate $SNR_s$ of energy potential according to the algorithm $SNR_s=20 \log_{10}(S_n)-K_s-\eta$ dB-Hz, wherein:
  $K_s$ is a characteristic constant based at least in part on said variance estimate $D_s$, and η is an energy loss based on digital processing.

* * * * *